United States Patent
Zhou et al.

(10) Patent No.: US 8,106,762 B2
(45) Date of Patent: Jan. 31, 2012

(54) ELECTRICAL APPARATUS WITH AN ALARM SYSTEM

(75) Inventors: He-Kang Zhou, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 360 days.

(21) Appl. No.: 12/387,041

(22) Filed: Apr. 27, 2009

(65) Prior Publication Data

US 2009/0270131 A1    Oct. 29, 2009

(30) Foreign Application Priority Data

Apr. 25, 2008   (TW) ................................ 97115397 A

(51) Int. Cl.
  *G08B 23/00*    (2006.01)
  *G08B 13/12*    (2006.01)
  *G08B 21/00*    (2006.01)

(52) U.S. Cl. ................... 340/500; 340/568.2; 340/568.3; 340/568.4; 340/539.1; 340/538.17

(58) Field of Classification Search .................. 340/500, 340/568.2, 568.3, 568.4
See application file for complete search history.

(56) References Cited

U.S. PATENT DOCUMENTS

| | | | |
|---|---|---|---|
| 4,222,043 A * | 9/1980 | Malavasi ........................ 340/541 |
| 6,150,940 A * | 11/2000 | Chapman et al. .......... 340/568.3 |
| 6,333,684 B1 | 12/2001 | Kang |
| 7,068,168 B2 * | 6/2006 | Girshovich et al. ......... 340/568.3 |
| 7,209,048 B1 * | 4/2007 | Pace et al. ..................... 340/687 |

FOREIGN PATENT DOCUMENTS

| | | |
|---|---|---|
| CN | 2171954 Y | 7/1994 |
| CN | 2563586 Y | 7/2003 |
| TW | M266507 U | 6/2005 |
| TW | M272171 U | 8/2005 |

* cited by examiner

*Primary Examiner* — Donnie Crosland
(74) *Attorney, Agent, or Firm* — Altis Law Group, Inc.

(57) ABSTRACT

An electrical apparatus with an alarm includes an electrical device and an alarm system, the electrical device and the alarm system being both connected to an external power supply. The alarm system includes a wireless communication circuit and a control module. The control module is connected between the external power supply and the wireless communication circuit. The control module controls the wireless communication circuit to send an alarm notification when the electrical device is disconnected from the external power supply.

20 Claims, 1 Drawing Sheet

ELECTRICAL APPARATUS WITH AN ALARM SYSTEM

BACKGROUND

1. Technical Field

The present disclosure relates to electrical apparatus with alarm systems, and more particularly to a household electrical apparatus with an alarm system.

2. Description of Related Art

As the technology for electrical apparatus develops, more and more families own a great number of household electrical apparatus, such as displays, televisions, fridges, air conditioners, and so on. Some of these devices, such as the displays, are expensive and are easily stolen by thieves. Because displays and other household electrical apparatus are being made smaller, they are in a greater risk of being stolen.

DETAILED DESCRIPTION

Reference will now be made to the drawings to describe an exemplary embodiment of the present disclosure in detail.

Figure 1:
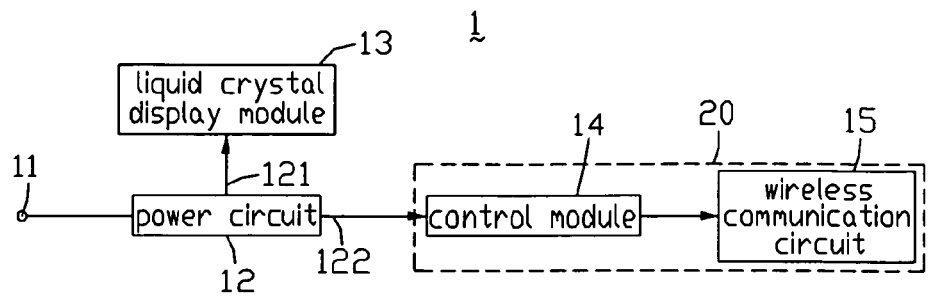
FIG. 1 is a block diagram of an electrical apparatus with an alarm system according to an exemplary embodiment of the present disclosure, the electrical apparatus being an liquid crystal display (LCD), and the alarm system including a control module and a wireless communication circuit.

Referring to FIG. 1, an electrical apparatus 1 with an alarm system according to an exemplary embodiment of the present disclosure is shown. The electrical apparatus 1 includes a power input terminal 11, a power circuit 12, an LCD module 13 and an alarm system 20. The alarm system 20 includes a control module 14 and a wireless communication circuit 15. The power circuit 12 includes a first output terminal 121 and a second output terminal 122.

External power, for example a 220V commercial power may be applied to the power circuit 12 through the power input terminal 11. The power circuit 12 converts the external power to a first operation voltage and a second operation voltage. The first operation voltage is supplied to the LCD module 13 through the first output terminal 121 to drive the LCD module 13. The second operation voltage is supplied to the alarm system 20 through the second output terminal 122. The alarm system 20 is disabled when the power input terminal 11 is connected to the external power, and is triggered when the power input terminal 11 is disconnected from the external power. In the alarm system 20, the control module 14 controls the wireless communication module 15 to be in a working state or an off-working state.

Figure 2:
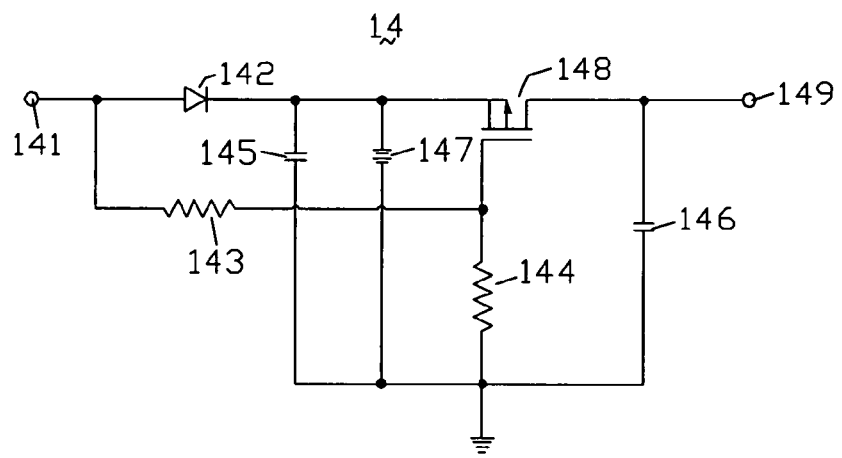
FIG. 2 is a circuit diagram of one embodiment the control module of FIG. 1.

Referring to FIG. 2, one embodiment of a circuit diagram of the control module 14 is shown. The control module 14 includes an input terminal 141, a diode 142, a voltage dividing resistor 143, a bias resistor 144, a first filtering capacitor 145, a second filtering capacitor 146, a battery 147, a transistor 148, and an output terminal 149.

A gate electrode of the transistor 148 is grounded via the bias resistor 144. Meanwhile, the gate electrode of the transistor 148 is connected to the input terminal 141 via the voltage dividing resistor 143. A source electrode of the transistor 148 is connected to a cathode of the diode 142 and an anode of the battery 147. The anode of the diode 142 is connected to the input terminal 141. The cathode of the battery 147 is grounded. The first filtering capacitor 145 is connected between the cathode of the diode 142 and ground. The second filtering capacitor 146 is connected between a drain electrode of the transistor 148 and ground. The drain electrode of the transistor 148 serves as the output terminal 149.

To further illustrate the control module 14, various component values are disclosed. However, it would be understood by one of ordinary skill in the art, that these component values may change depending on the embodiment. In one example, the battery 145 may be a rechargeable battery. The voltage dividing resistor 143 has a resistance of 1 KΩ and the bias resistor 144 has a resistance of 10 KΩ. The transistor 148 is a field-effect transistor, such as a P-channel metal oxide semiconductor enhancement mode field-effect transistor with a threshold voltage lower than about −0.6V.

Figure 3:
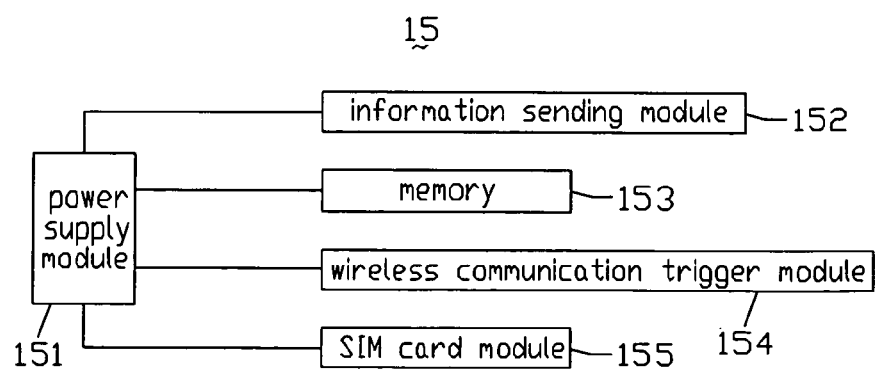
FIG. 3 is a block diagram of one embodiment of the wireless communication circuit of FIG. 1.

Referring to FIG. 3, a block diagram of the wireless communication circuit is shown. The wireless communication circuit 15 includes a power supply module 151, an information sending module 152, a memory 153, a wireless communication trigger module 154 and a subscriber identity module (SIM) card module 155. The power supply module 151 supplies operation voltages to the information sending module 152, the memory 153, the wireless communication trigger module 154 and the SIM card module 155, respectively. The memory 153 stores a phone number, for example, a mobile phone of the owner of the electrical apparatus 1. The SIM card module 155 comprises a valid phone number different from the phone number stored in the memory 153, which can be used to communicate with other people.

When the power supply module 151 supplies the operation voltage to the wireless communication trigger module 154, the wireless communication trigger module 154 triggers the information sending module 152 to send alarm notification to the owner of the mobile phone number stored in the memory 153, namely the owner of the electrical apparatus 1, in order to inform the owner that the electrical apparatus 1 is being stolen, wherever the owner is.

The following description show an operation of the alarm system 20. When the external power is supplied to the alarm system 20 through the power input terminal 11, the power circuit 12 converts the external power to a first operation voltage and a second operation voltage. The first operation voltage is provided to the LCD module 13 and the second operation voltage is provided to the control module 14. The second operation voltage is preset to about 5V in this embodiment. The second operation voltage is provided to the source electrode of the transistor 148 through the diode 142. The second operation voltage transmits to ground through the voltage dividing resistor 143 and the bias resistor 144, thereby providing an about 4.5V voltage to the gate electrode of the transistor 148. Therefore, a voltage Vgs between the gate electrode and the source electrode of the transistor 148 is about −0.5V. Because the Vgs is greater than the threshold voltage −0.6V, the transistor 148 is turned off to prevent the second operation voltage from being supplied to the power supply module 151 via the output terminal 149. Thus the wireless communication module 15 is disabled. After being filtered by the first filtering capacitor 145, the second operation voltage charges the battery 147 to about 5V.

When the electrical apparatus 1 is disconnected from the external power, which indicates the electrical apparatus 1 is possibly being taken away by a thief, who cuts off the power supplied from the power input terminal 11, the voltage of the gate electrode of the transistor 148 becomes about 0V. The battery 147 supplies a voltage to the source electrode of the transistor 148, and the voltage of the source electrode of the transistor 148 keeps at about 5V. Therefore, the voltage Vgs between the gate electrode and the source electrode of the transistor 148 drops to about −5V, which is lower than the threshold voltage −0.6V, to turn on the transistor 148. Then the battery 147 provides power to the wireless communication module 15 via the output terminal 149.

The power supply module 151 receives the power supplied from the battery 147, and transmits the power to operation voltages to the information sending module 152, the memory 153, the wireless communication trigger module 154 and the SIM card module 155, respectively. The wireless communication trigger module 154 triggers the information sending module 152 to send alarm notification, such as a call through the SIM card module 155, to the owner of the mobile phone number stored in the memory 153. The owner of the mobile phone receives the call and recognizes that the phone number stored in the SIM card module 155 is calling him, so the person can be aware of that the electrical apparatus 1 is being stolen. Thus, the person can take preventive and according measures. Thus, the probability of losing the electrical apparatus is decreased.

Other embodiments of the present electrical apparatus with alarm system can include the following. For example, the memory can store a short message. When the electrical apparatus is disconnected with the external power, the wireless communication trigger module triggers the information sending module 152 to send the short message to the owner. Thus, the person receiving the short message may be aware that the electrical apparatus is being stolen. Therefore, the person can do something to prevent the stealing, and the probability of losing the electrical apparatus is decreased.

In another example, the phone number stored in the memory can be a landline telephone number, for example an office telephone number. When the electrical apparatus is kept at home but the owner stays in his office, the alarm system 20 can send alarm notification to the owner through the landline telephone.

In another example, the LCD module 13 can be replaced with other electrical device, such as televisions, notebooks and so on.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical apparatus with an alarm system, comprising:
 a power input terminal to provide an operation voltage for operation of the electrical apparatus; and
 an alarm system connected to the power input terminal to receive the operation voltage, the alarm system comprising:
 a wireless communication circuit; and
 a control module connected between the power input terminal and the wireless communication circuit, the control module comprising a voltage dividing resistor, a bias resistor, a battery and a transistor structured and arranged such that when an input power is provided to the power input terminal, the power input terminal provides the operation voltage to the transistor through the voltage dividing resistor and the bias resistor, to turn off the transistor, wherein the wireless communication circuit is in an off-working state, and when no input power is provided to the power input terminal, the transistor is turned on and the battery provides power to the wireless communication circuit such that the wireless communication circuit is in a working state to send an alarm notification.

2. The electrical apparatus with alarm system of claim 1, wherein the transistor is a P-channel metal oxide semiconductor enhancement mode field-effect transistor.

3. The electrical apparatus with alarm system of claim 2, wherein a gate electrode of the transistor is connected to ground via the bias resistor, and is also connected to the power input terminal via the voltage dividing resistor.

4. The electrical apparatus with alarm system of claim 3, wherein a source electrode of the transistor is connected to the power input terminal and the battery.

5. The electrical apparatus with alarm system of claim 3, wherein the resistance of the bias resistor is about 10 kΩ, and the resistance of the voltage dividing resistor is about 1 kΩ.

6. The electrical apparatus with alarm system of claim 5, wherein the control module further comprises a diode connected between the power input terminal and the source electrode of the transistor.

7. The electrical apparatus with alarm system of claim 6, wherein the control module further comprises a first filtering capacitor connected between the source electrode of the transistor and ground.

8. The electrical apparatus with alarm system of claim 7, wherein the control module further comprises a second filtering capacitor connected between a drain electrode of the transistor and ground.

9. The electrical apparatus with alarm system of claim 1, wherein the electrical apparatus further comprises a power circuit connected between the power input terminal and the alarm system, the power circuit converts the input power to a first operation voltage and a second operation voltage, and the first operation voltage and the second operation voltage are provided to the electrical device and the alarm system, respectively.

10. The electrical apparatus with alarm system of claim 9, wherein the second operation voltage is about 5V.

11. The electrical apparatus with alarm system of claim 10, wherein the threshold voltage of the transistor is lower than about −0.6V.

12. The electrical apparatus with alarm system of claim 1, wherein the wireless communication circuit comprises a power supply module, an information sending module, a memory, a wireless communication trigger module and a subscriber identity module (SIM) card module, the memory stores a phone number, the SIM card module comprises a phone number different from the phone number stored in the memory, and the wireless communication trigger module triggers the information sending module to send the alarm notification to a phone which has the phone number stored in the memory.

13. The electrical apparatus with alarm system of claim 12, wherein the information sending module sends out a call as the alarm notification.

14. The electrical apparatus with alarm system of claim 12, wherein the memory further comprises a short message and the information sending module send out the short message as the alarm notification.

15. The electrical apparatus with alarm system of claim 1, wherein the electrical device is a liquid crystal display module.

16. An electrical apparatus with an alarm system, comprising:
- a power circuit receiving an external power and providing a first operation voltage and a second operation voltage;
- an electrical device receiving the first operation to operate; and
- an alarm system receive the second operation voltage, the alarm system comprising:
- a wireless communication circuit; and
- a control module connected between the power circuit and the wireless communication circuit, the control module comprising a voltage dividing resistor, a bias resistor, a battery and a transistor structured and arranged such that when the external power is provided to the power circuit, the power circuit provides the second operation voltage to the transistor through the voltage dividing resistor and the bias resistor, to turn off the transistor, wherein the wireless communication circuit is in an off-working state, and when no external power is provided to the power circuit, the transistor is turned on and the battery provides power to the wireless communication circuit such that the wireless communication circuit is in a working state to send an alarm notification.

17. The electrical apparatus with alarm system of claim 16, wherein a gate electrode of the transistor is connected to ground via the bias resistor, and is also connected to the power circuit via the voltage dividing resistor.

18. The electrical apparatus with alarm system of claim 17, wherein a source electrode of the transistor is connected to the power input terminal and the battery, and a drain electrode of the transistor is connected to the wireless communication circuit.

19. The electrical apparatus with alarm system of claim 18, wherein the control module further comprises a diode connected between the power circuit and the source electrode of the transistor, a first filtering capacitor connected between the source electrode of the transistor and ground, and a second filtering capacitor connected between the drain electrode of the transistor and ground.

20. The electrical apparatus with alarm system of claim 18, wherein the transistor is a P-channel metal oxide semiconductor enhancement mode field-effect transistor.

* * * * *